(12) United States Patent
Ullmann et al.

(10) Patent No.: US 9,599,451 B2
(45) Date of Patent: Mar. 21, 2017

(54) PLASTIC FILM AND TOUCH SENSOR

(75) Inventors: Andreas Ullmann, Zirndorf (DE); Walter Fix, Furth (DE); Norbert Laus, Simmelsdorf (DE); Haymo Katschorek, Obermichelbach (DE)

(73) Assignee: PolyIC GmbH & Co. KG, Furth (DE)

( * ) Notice: Subject to any disclaimer, the term of this patent is extended or adjusted under 35 U.S.C. 154(b) by 85 days.

(21) Appl. No.: 14/241,695

(22) PCT Filed: Jul. 11, 2012

(86) PCT No.: PCT/EP2012/063607
§ 371 (c)(1),
(2), (4) Date: Mar. 24, 2014

(87) PCT Pub. No.: WO2013/029860
PCT Pub. Date: Mar. 7, 2013

(65) Prior Publication Data
US 2014/0218053 A1  Aug. 7, 2014

(30) Foreign Application Priority Data

Aug. 31, 2011  (DE) .......................... 10 2011 111 506

(51) Int. Cl.
*G01B 7/14*      (2006.01)
*G06F 3/044*     (2006.01)

(52) U.S. Cl.
CPC .............. *G01B 7/14* (2013.01); *G06F 3/044* (2013.01); *G06F 2203/04103* (2013.01)

(58) Field of Classification Search
CPC .............. G06F 3/033; G06G 5/00; G01B 7/14
See application file for complete search history.

(56) References Cited

U.S. PATENT DOCUMENTS 5,159,159 A   10/1992  Asher
5,263,375 A *  11/1993  Okada .................... B25J 13/085
                                                  73/862.042

(Continued)

FOREIGN PATENT DOCUMENTS

CN       101900950          12/2010
DE    102009014757 A1     10/2010

(Continued)

OTHER PUBLICATIONS

International Search Report PCT/EP2012/063607 Sep. 2012.
Oral Proceedings Oct. 28, 2016.

*Primary Examiner* — Son Le
*Assistant Examiner* — Alvaro Fortich
(74) *Attorney, Agent, or Firm* — William Squire

(57) ABSTRACT

Disclosed is a plastic film and to a touch module produced therefrom. The module is constructed from two conductive layers with an insulation layer in between, as are used in capacitive touch pads and/or touch screens, for example. The problem of connecting the respective x or y sensors across two planes in a cost-effective manner employs foldable sensor planes in the plastic film suitable for mass production. The connections and conductor tracks are concentrated on one plane on a sensor side wherein the sensor planes are arranged on flexible materials. The registering of the two planes relative to each other is simplified via a secure mechanical connection of the two planes via a fold in the film.

11 Claims, 6 Drawing Sheets

(56) References Cited

U.S. PATENT DOCUMENTS

| | | | |
|---|---|---|---|
| 6,426,861 B1 * | 7/2002 | Munshi | B32B 27/00 29/25.42 |
| 6,473,074 B1 | 10/2002 | Okahashi | |
| 7,030,860 B1 * | 4/2006 | Hsu | G06F 3/044 178/18.06 |
| 8,228,306 B2 * | 7/2012 | Long | G06F 3/0412 178/18.01 |
| 8,446,388 B2 * | 5/2013 | Kim | G06F 3/0412 178/18.03 |
| 2002/0047107 A1 * | 4/2002 | Lindstrom | G08B 13/2417 252/500 |
| 2008/0036799 A1 | 2/2008 | Ittel | |
| 2010/0139955 A1 * | 6/2010 | Long | G06F 3/044 174/257 |
| 2010/0200539 A1 * | 8/2010 | Yun | B23K 26/4065 216/13 |
| 2010/0230181 A1 | 9/2010 | Suzuki | |
| 2010/0300729 A1 | 12/2010 | Matsuda et al. | |
| 2012/0069517 A1 * | 3/2012 | Prest | G06F 1/1656 361/679.56 |
| 2012/0193130 A1 | 8/2012 | Fix et al. | |
| 2012/0256876 A1 * | 10/2012 | Yeh | G06F 3/044 345/174 |
| 2013/0038378 A1 * | 2/2013 | Singh | G06F 3/044 327/517 |
| 2013/0038563 A1 * | 2/2013 | Yilmaz | H03K 17/9622 345/174 |
| 2013/0168138 A1 * | 7/2013 | Yamazaki | H05K 1/0296 174/253 |

FOREIGN PATENT DOCUMENTS

| | | |
|---|---|---|
| EP | 1469415 A2 | 10/2004 |
| TW | 201027404 A | 7/2010 |
| WO | WO2006/075121 A2 | 7/2006 |

* cited by examiner

PLASTIC FILM AND TOUCH SENSOR

The invention relates to a plastic film and a touch sensor produced therefrom, in particular a touch sensor which is constructed from two conductive layers with an insulating layer between them, such as are used for example in capacitive touchpads and/or touchscreens.

It is known to manufacture the two conductive layers of a touch sensor which, together, define the input zones or crossover points of the touch sensor on two substrates and then to laminate or glue them, matching each other exactly, in an elaborate production process.

According to this state of the art, the conductive layers are placed, register-accurate, one above the other and joined together. Finally, the connections of the upper and lower strip conductors, thus the y-sensors and the x-sensors, are brought together via a bridge in order to be able to connect the touch sensor to evaluation electronics.

The electrically conducting bridge is formed for example from silver paste, anisotropic conductive adhesive and/or a bonding compound via an ACF (Anisotropic Conductive Film) with a so-called flex tail. This is a flexible carrier with wiring which guides the connections and which connects to the conductive transparent layer. In contrast to the transparent area of the touch sensor, which, until now, has been manufactured from ITO and is rigid, the flex tail is in fact not transparent, but is bendable. The two conductive layers can also be equipped with a flex tail, wherein the two flex tails from the different planes are then brought together in order that they fit in for example with a corresponding connector for the evaluation electronics.

A disadvantage of the state of the art is the necessity of bringing together the connections from different planes, such as for example attaching the flex tail to the ITO layers, because a very technical and cost-intensive procedure is realized here.

The object of the present invention is therefore to provide a touch sensor and/or a plastic film for producing a touch sensor, by which the disadvantages of the state of the art are surmounted.

This object is achieved by a plastic film which has at least three areas, namely at least a first and a second transparent area, in which the plastic film has strip conductors at least on one side, wherein the strip conductors of the first transparent area are aligned transverse to the strip conductors of the second transparent area, with the result that, when the plastic film is folded together along a fold line, they form crossover points, and a third area, which is arranged between the first and the second transparent area and which has the fold line as well as connection tracks for connecting the strip conductors of the first and/or second transparent area. Moreover, the object is achieved by a touch sensor which comprises such a plastic film, wherein the first and second transparent areas are connected to each other via a transparent and electrically insulating layer by folding the plastic film along the fold line, advantageously such that the connections of the strip conductors of the two transparent conductive areas lying on different planes are brought together on one plane by means of the third area comprising the fold line.

The invention relates to a plastic film and a touch module produced therefrom, in particular a touch module which is constructed from two conductive layers with an insulating layer between them, such as are used for example in capacitive touchpads and/or touchscreens. The problem of connecting the respective x- or y-sensors over two planes is solved here for the first time in a cost-effective manner suitable for mass production.

Through the invention, it is possible in the touch sensor for the connection tracks for connecting the strip conductors which are arranged on different planes in the touch sensor as well as in the fold area of the touch sensor to be guided from one plane onto the other respectively by means of the third area located between the first and second transparent areas of the plastic film, which third area comprises the fold of the plastic film in the touch sensor produced therefrom. A connection of the touch sensor to evaluation electronics is thereby achieved on a single plane. This makes possible a cost-effective production of the touch sensor via the folding and gluing of the plastic film.

For the first time, the invention solves the problem of wiring which exists in today's ITO touch sensors because these always connect two conductive layers of two inflexible substrates on two planes. Here, the high expenditure in terms of process engineering and costs is replaced by a simple production method which can be operated continuously and discontinuously, wherein an equivalent end product is obtained.

This is possible through the foldable sensor planes shown here according to the invention, wherein in the description and in the figures layouts are disclosed by which a transition of the connections of the different planes with the help of a bridge is superfluous, as the connections and connection tracks are finally all concentrated on one plane (sensor side). These can then be contacted on one side without trouble. This solution to the problem makes use of the advantage that, unlike in the conventional printed circuit board industry, the sensor planes here are arranged on flexible materials.

As the two sensor planes are produced directly next to each other or one after the other on a plastic film in a stamping area, the registering of the two planes relative to each other is furthermore simplified, as there is a secure mechanical connection of the two planes.

The gluing can take place e.g. via an OCA (optical clear adhesive) and fold lamination, but another type of optically clear adhesive can also be used. The adhesive layer can be applied to one or to both transparent first and second areas or to both sensor parts, over the whole surface or in a decoration.

In the present case, areas in which strip conductors of different planes, which are electrically insulated from each other preferably at the site of the crossover point, are superimposed in a crossover manner are called "crossover points".

In the present case, structured electrically conductive layers and conductive areas on the plastic film, such as are known for example from DE 10 2009 014 757 A1, are preferably called "strip conductors". Networks of conductive tracks ("conductors") are applied to a transparent carrier such that a sufficient transparency for the human eye is preserved in the area of the network. Despite the thin, preferably smaller than 20 µm, in particular preferably smaller than 10 µm and in particular preferably smaller than 5 µm wide, conductors used which form the networks, an electrical conductivity is achieved which is comparable to that of ITO. The coverage of the transparent carrier with conductive material is preferably less than 20%, in particular preferably less than 10% and quite particularly preferably less than 5%.

To form the touch module, the conductive tracks of the networks are preferably arranged such that no moiré effect occurs, thus no additional coarse grids appear visible for the eye due to the superimposition of the strip conductors of fine networks. For this, the parallelism of linear or wavy strip conductors in the network for example is interrupted and/or the azimuth angle thereof is varied.

Electrically conductive layers and/or areas, strip conductors and/or connection tracks for connecting the strip conductors, as well as the connections consist for example of thin wires, metallized layers and/or networks of conductive material on a transparent carrier. A metal, e.g. silver, copper, gold, aluminum, an alloy, a conductive paste, a metal paste, an anisotropically conductive film or another conductive material, for example an organic compound with movable charge carriers such as polyaniline, polythiophene and others, can be used as conductive material.

All connections of the strip conductors and connection tracks for connecting the strip conductors are advantageously concentrated or brought together on one plane. These can then be contacted on one side without trouble.

According to an advantageous embodiment, all conductive areas and layers, strip conductors and connections and connection tracks for connecting the strip conductors on the film are formed from a single conductive material.

The plastic film is for example a polyethylene terephthalate=PET film, but can also be a transparent or partially transparent other plastic film, for example a film made of a polyolefin such as polyethylene (PE), polypropylene (PP), polyvinyl chloride (PVC), polystyrene (PS), polyester (PE) and/or polycarbonate (PC) or for example of PMMA, polyamide or polyimide. Alternatively to a pure plastic film, the use of paper or card at least in areas, or also the use of a multi-layered hybrid material which has plastic layers and layers of fibrous material, e.g. paper, cotton, or other natural or synthetic fibers, is also possible. Such films also represent plastic films within the meaning of the present invention.

An embodiment in which the plastic film consists of a multi-layered hybrid material which has in particular plastic layers and layers of fibrous material, e.g. paper, cotton or other natural or synthetic fibers, is also advantageous.

Such a hybrid material can be for example a plastic film with paper layers applied to the outside or a fiber layer with plastic layers applied to the outside. In particular, it is possible to omit opaque layers in such a multi-layered hybrid material in areas of surface in order to provide in these areas of surface transparent areas which are enclosed by neighboring transparent layers.

The electrically insulating and—at least in the area of the conductive transparent layers lying one on top of the other—transparent connection is for example an adhesion.

This can take place via an OCA (optical clear adhesive).

For example, a two-component adhesive can also be used as adhesive, wherein in each case one of the transparent areas is again preferably coated with a component, which areas then adhere during the combining and in particular react with each other.

The adhesive layer can be applied to both conductive layers on one side, on both sides as well as over the whole surface and/or in a decoration, i.e. only in areas of surface.

According to an advantageous embodiment, the electrically insulating layer has a thickness of from 1 to 200 µm, preferably a thickness of from 5 to 70 µm and in particular preferably a thickness of from 10 to 50 µm.

However, a fold lamination can also be used to connect the two conductive layers. This can also be carried out for example in the roll-to-roll process.

According to an advantageous embodiment, the plastic film also comprises a fourth transparent or non-transparent area which adjoins one of the transparent areas and which, after the adhesion of the first and second areas, correspondingly projects beyond the edge thereof.

This embodiment is advantageous in particular when the plastic film is folded with the two covered sides together, because the outer side of the plastic film is then not covered with strip conductors. The strip conductors located on the insides are thereby mechanically protected, and an additional encapsulation for example can be omitted.

The folding of the plastic film takes place for example with a bending radius of from 10 to 100 µm.

The third area of the plastic film, which can be transparent or non-transparent and which can be reinforced for example by one or more protective layers, comprises the fold line. The fold line is preferably arranged in a stamping area of the plastic film. The plastic film is folded along the fold line. The fold line is for example either as long as the edge of a first or second transparent area or it is shorter. For this, the third area has for example a gap which severs the plastic film completely or in areas. This is advantageous in particular because a formation of bubbles and/or folds can thereby be prevented when the transparent areas are placed one on top of the other.

The three areas can be arranged on one side of the plastic film or also alternately on both sides. The through-connections are then for example simple holes in the plastic film and/or are placed around the edge thereof.

The invention is explained in more detail in the following with reference to some embodiment examples.

Figure 1:
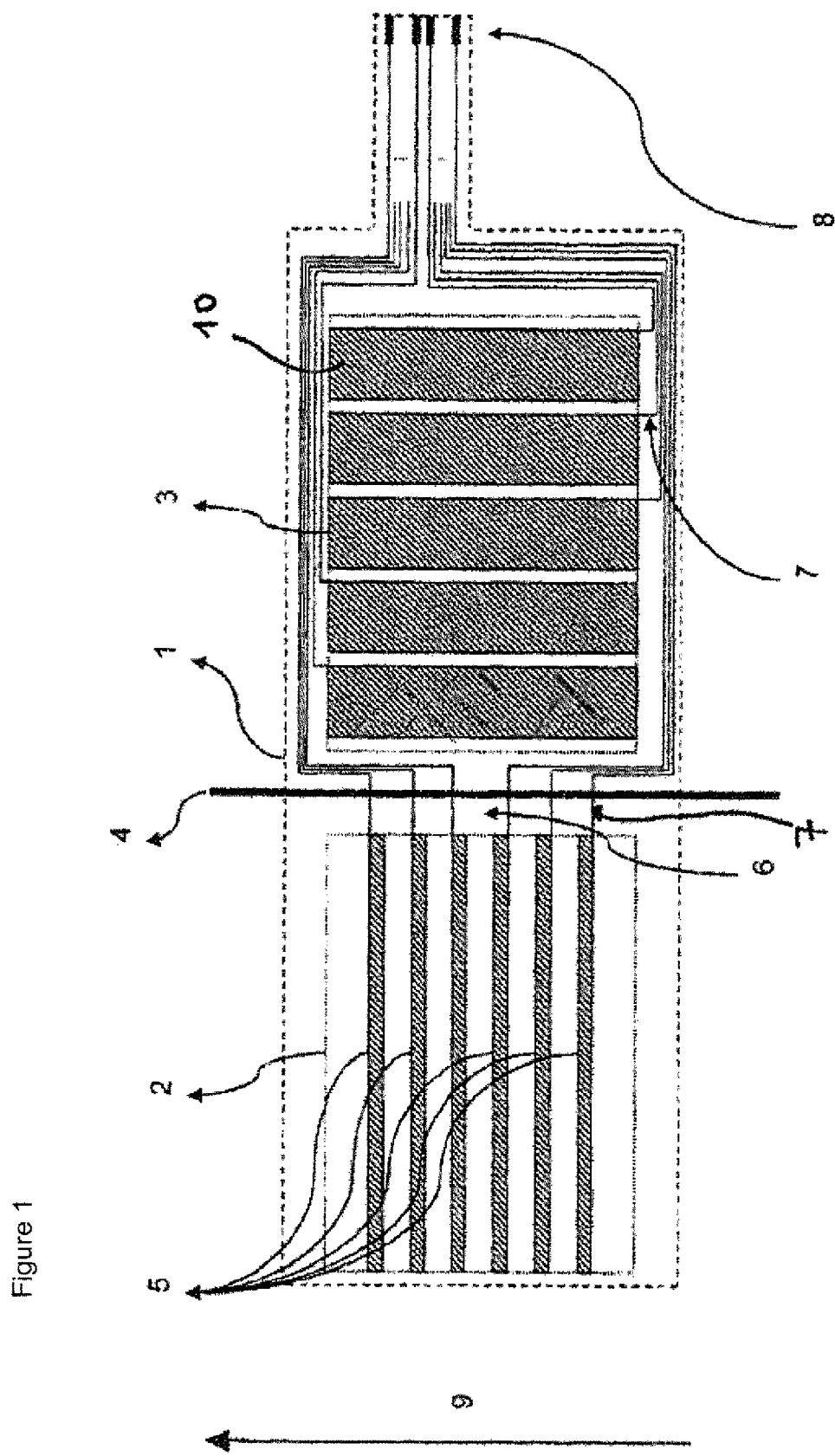
FIGS. 1 to 3 show possible layouts for plastic films before the folding.

FIG. 1 shows the top view of a plastic film in which three areas 2, 3, and 6 are arranged on one side of the plastic film in a stamping area 1 of the plastic film, and shows the layout before the folding.

Seen from left to right inside a stamping area 1 are, firstly, the first transparent area 2 and, then, the third area 6 placed between the first and a second transparent area 2 and 3. The first transparent area 2 has strip conductors 5 and the second transparent area 3 has strip conductors 10. The third area 6 has connection tracks 7 for connecting the strip conductors 5. The strip conductors 5 form for example the x-sensors of the touch sensor. To the right of this, the second transparent area 3 is seen with the strip conductors 10 of transparent conductive networks running from top to bottom. The strip conductors 10 form the y-sensors.

Furthermore, the running direction 9 of the belt, for example during printing, is recognizable, and parallel to this, placed almost in the center of a stamping area 1, a fold line 4. The fold line 4 lies in the third area 6, through which the connection tracks 7 for connecting the strip conductors 5 run.

The transparent areas 2 and 3 are in each case coated with strip conductors 5 and 10 or metallized. The thickness of the conductive layers lies in the range of from 5 to 350 nm, preferably from 10 to 300 nm and in particular preferably in the range of from 50 to 80 nm.

The transparent area 2 comprises the strip conductors 5 of the x-sensors, the connection tracks 7 of which are guided over the third area 6 with the fold line 4. At a connection 8, all connection tracks 7 for connecting the strip conductors 5 and 10 converge and can be connected to evaluation electronics (not shown). The connection tracks 7 for connecting the strip conductors 5 serve for the electrical connection of the x-sensors with the connection 8. By means of the third area 6 comprising the fold line and the connection tracks 7 running in the area 6, the connections 8 of the strip conductors 5 and 10 of the two areas 2 and 3 lying on different planes in the folded state are thus brought together on one plane.

The connection 8 can be for example a connector.

The third area 6 can be transparent or non-transparent, and also for example translucent or opaque, and can be coated with different single- or multi-layered protective layers 14.

Figure 2:
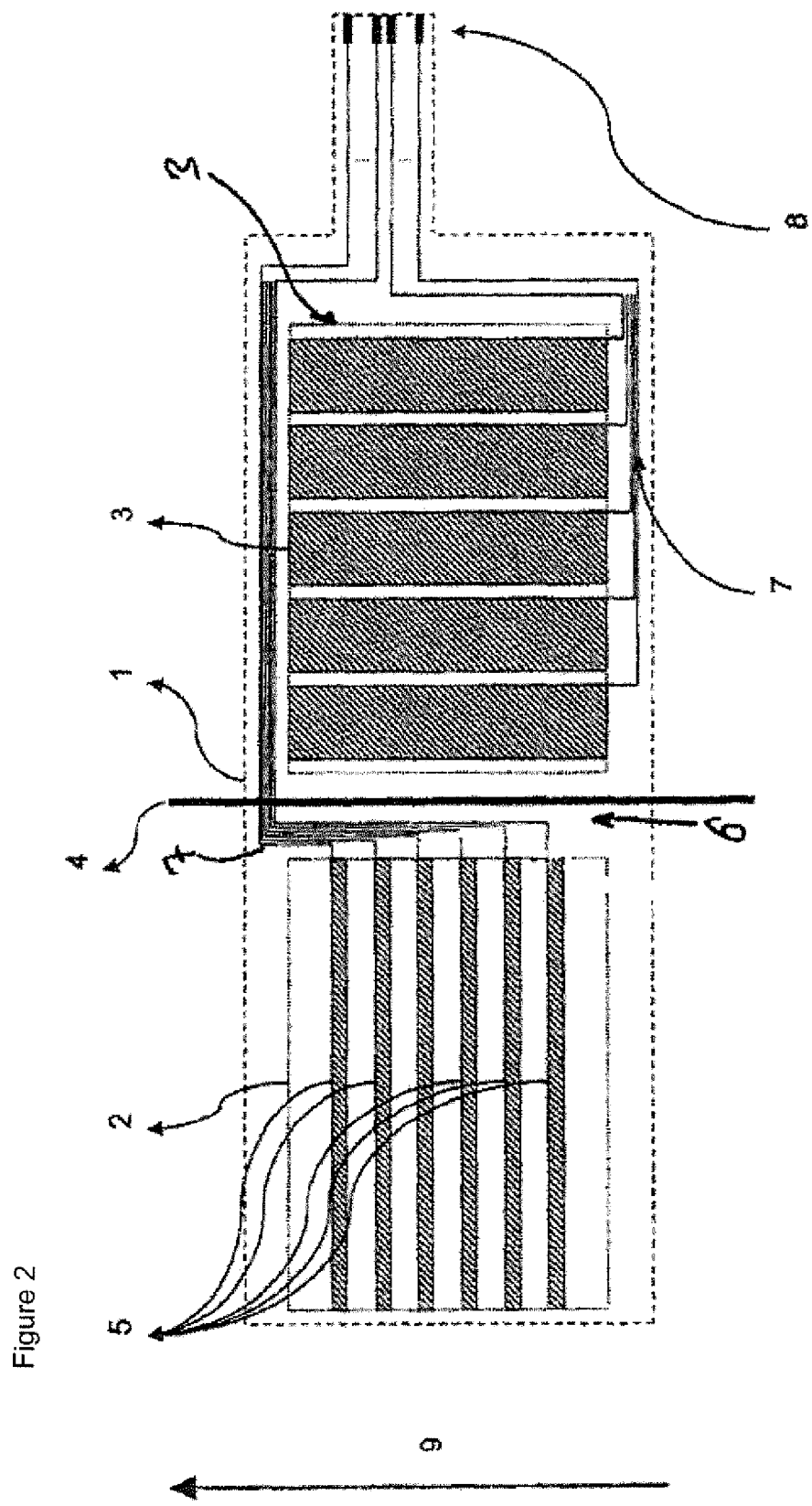

FIG. 2 shows a similar embodiment to FIG. 1, but with a somewhat altered layout, because here the connection tracks 7 for connecting the strip conductors of the x-sensors 5 lie on one side of the third area 6 and are not distributed fifty-fifty onto both sides of the third area 6, as in FIG. 1.

FIG. 3 again shows a similar embodiment to the first two FIGS. 1 and 2. However, the clearly shortened fold line 4 is recognizable here, and a gap 11 in the area 6. This embodiment is particularly advantageous in order to avoid an undesired formation of bubbles and/or folds during the folding or fold lamination.

Figure 4:
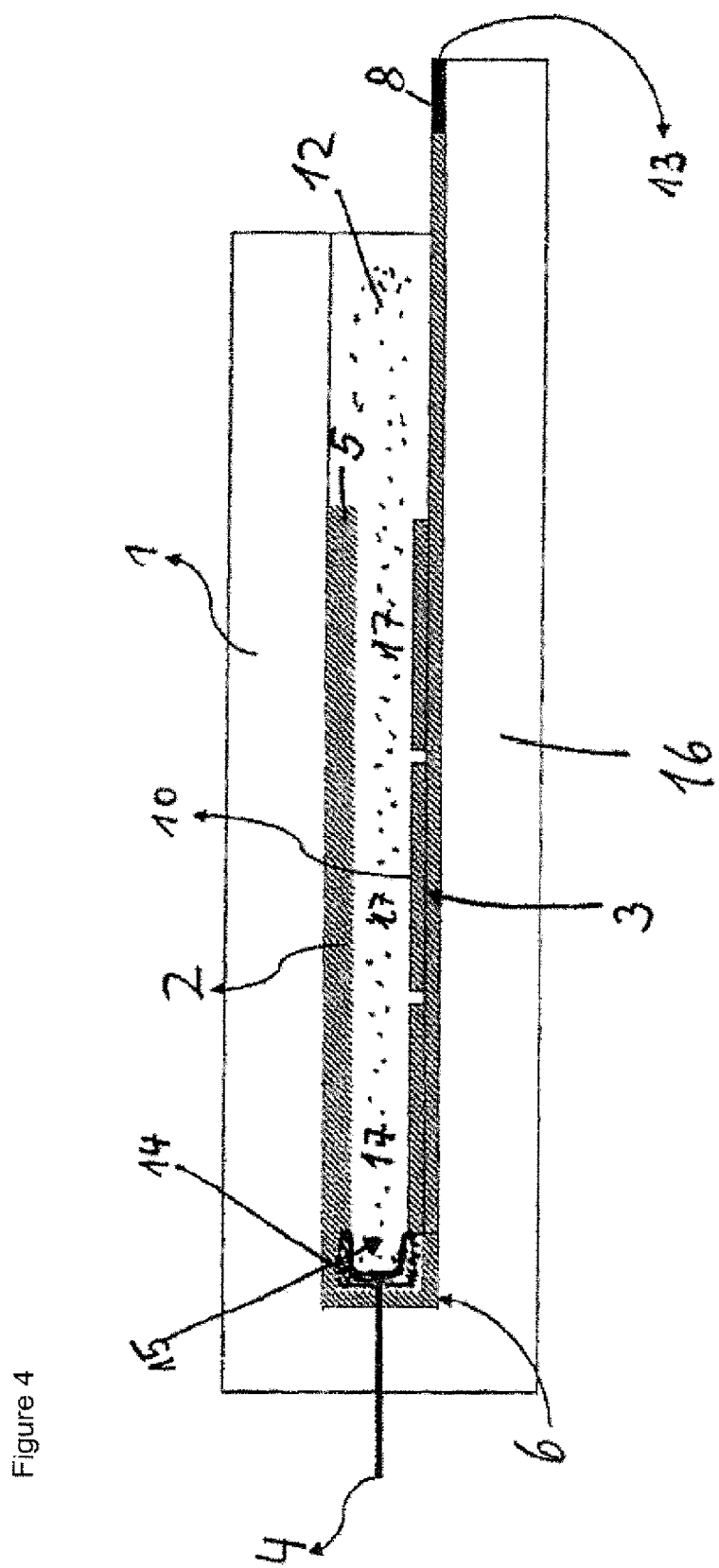
FIG. 4 shows a cross section through a folded plastic film.

Finally, FIG. 4 shows a cross section through a finished touch sensor. The two transparent areas 2 and 3 lying one on top of the other are seen which lie one on top of the other on the side of the face in the example shown here, thus with the two metallized or conductive sides facing each other. The connections 8 of the touch module lead to evaluation electronics 13 (not shown).

The three strip conductors 10 form, in the area 3 on the substrate 16 with the strip conductors 5, three crossover points 17. The strip conductors 5 and 10 forming the y- and x-sensors are formed by conductive layers which are spaced apart from each other by a transparent electrically insulating layer 12. For example, the electrically insulating layer 12 can be an OCA (optical clear adhesive), or a two-component adhesive resin or other. This insulating layer 12 is transparent and preferably homogeneous. It can be different systems which are adhesive and also still have an adhesive surface after curing, or not, and/or can be such systems that cure by UV radiation and/or by an increase in temperature. The insulating layer 12 can have a thickness in the range of from 10 to 200 µm, preferably from 20 to 100 µm, but can also be thicker than 200 µm or thinner than 10 µm.

The fold line 4 shows the site where the stamping area 1 of the plastic film is folded. A fold 15 with a bending radius which can lie for example in the range of from 10 to 100 µm is recognizable. The area of the bending radius of the fold 15 is non-transparent in the embodiment shown here and the connection tracks 7 in the area 6 are coated or reinforced with the protective layer 14. This protective layer can contain for example ACF or ACP (ACF=anisotropic conductive film or ACP=anisotropic conductive paste). The protective layer 14 can be designed single- or multi-layered.

The protective layer 14 protects the plastic film from mechanical damage or other environmental influences and/or reinforces the area 6 of the fold 15 only optionally. Normally, the conductive materials used in the transparent areas 2 and 3 can be present alone in the fold 15. However, as cracks can form easily during folding, these are compensated for by such a reinforcement.

Instead of or in addition to the two materials ACF and ACP, for example conductive metals and alloys thereof, such as conductive silver, silver paste or organically conductive materials such as PEDOT, PANI, carbon black, carbon nanotubes, etc., can also be used.

In order to protect for example the connection tracks for connecting the strip conductors which cross the fold line 4, the protective layer 14 can be printed on either locally, in a line decoration, or all over. In the case shown here, the protective layer 14 is limited to the area of the fold 15 or—in short—to the kink area or bend area of the stamping area 1 of the plastic film. The protective layer 14 can also be applied partially at other sites and/or over the whole stamping area 1 of the plastic film.

The folding can be carried out in the roll-to-roll process (R2R) or after the cutting as a batch process. The individual work steps can thus be carried out either continuously or discontinuously.

For the roll-to-roll process, the film can be designed as a virtually endless roll. For a batch process, sheets which have one or more uses can be detached from the virtually endless roll. In other words, the folding sensors are contained as an individual image on the sheet or several image units are combined on one sheet. In addition, it is also possible to cut the folding sensor structures directly from the film as labels and to feed them to a downstream folding process. In a preferred embodiment example, the labels are then cut directly according to the geometry that the folding sensor has as an end product. For the cutting of the sheets or labels, laser cutting processes or stamping processes can also be used.

Furthermore, it is possible to carry out the precise adjustment in the folding by punched holes, which are produced for example by means of lasers. Alternatively, the use of optically detectable register marks, in particular that are printed or applied together with the strip conductors, is conceivable. For this, for example an OCA layer is applied to the one sensor plane first, then the sensor planes can be aligned relative to each other and glued together via the OCA.

Figure 5:
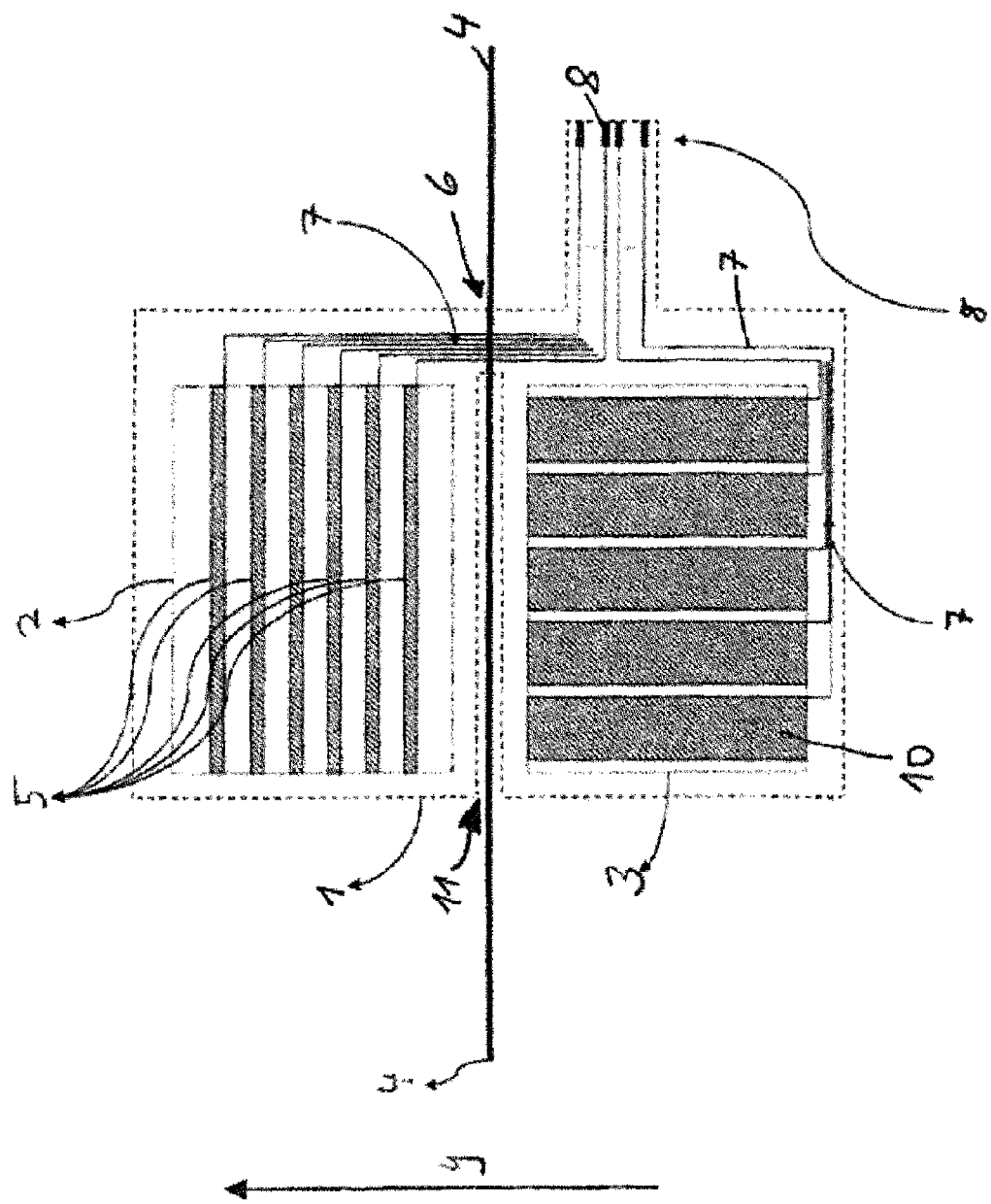
FIGS. 5 and 6 show layouts for plastic films before the folding.
Figure 6:
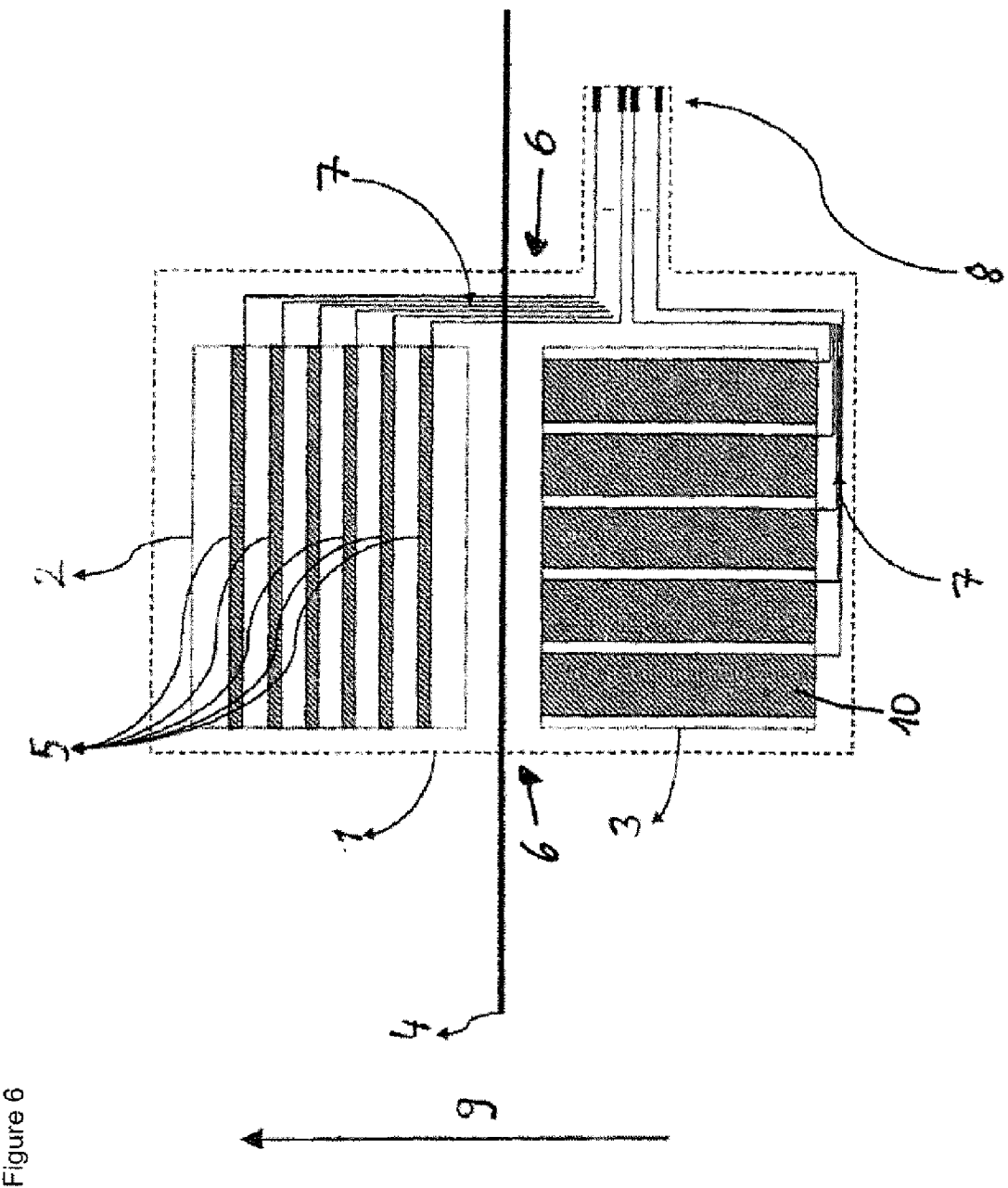

FIGS. 5 and 6 show layouts of a plastic film according to embodiments of the invention, in which the stamping area 1 lies transverse to the running direction 9 of the belt. Likewise, the fold line 4 runs transverse to the running direction 9 of the belt here.

Figure 3:
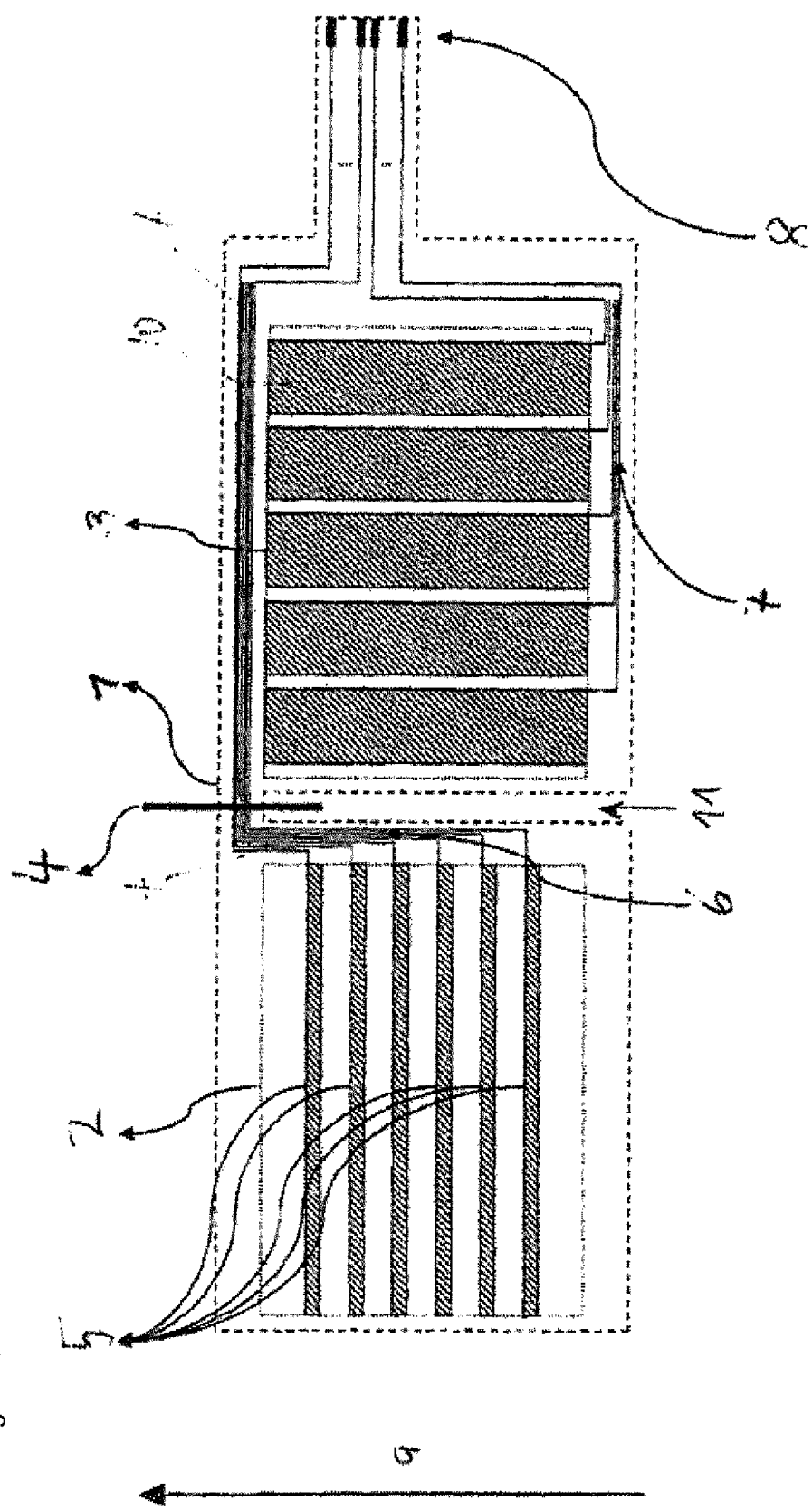

As in top view in the previous FIGS. 1 to 3, the two transparent areas 2 and 3 and, between them, the area 6 in which the connection tracks 7 for connecting the strip conductors and the fold line 4 lies are again recognizable, Again, the strip conductors 5 form the x-sensors of the transparent area 2 and the strip conductors 10 form the y-sensors of the transparent area 3. The connection tracks 7 for connecting the strip conductors and the connection 8 can also be seen again.

In FIG. 5, an embodiment with a gap 11 in the area 6 can again be seen, with the result that the formation of bubbles and folds is suppressed during the folding, and an embodiment without a gap is shown in FIG. 6.

The invention claimed is:

1. A capacitive touch sensor comprising:
an electrically insulating plastic film which has at least three areas, at least a first and second transparent area, in which the plastic film has strip conductors at least on one side, wherein the strip conductors of the first transparent area are aligned transverse to the strip conductors of the second transparent area, with the result that, when the plastic film is folded together along a fold line, the strip conductors in the first and second areas form a touch sensor field comprising a touch detecting network of overlying crossover points, and the third area is arranged between the first and the second transparent areas and which third area has the fold line and connection tracks for connecting the strip conductors of the first and/or second transparent areas;

wherein the first and second transparent areas are connected to each other via a transparent and electronically insulating layer by the fold in the plastic film along the fold line;

wherein connections of the strip conductors of the two transparent conductive areas normally coplanar are brought together in an overlying arrangement via the third area comprising the fold line, in that the electrically insulating layer consists of an optical clear adhesive (OCA) forming a capacitive touch sensor of the overlying strip conductors, and in that in the first and/or second transparent area the strip conductors are formed as conductive areas which in each case form the detecting network of conductive tracks each of which with a width smaller than/equal to 20 μm, wherein the conductive tracks are arranged at a distance from each other which allows the respective network to appear transparent for the human eye; and a carrier with conductive material within the transparent conductive areas, wherein the coverage of the carrier with conductive material within the transparent conductive areas amounts to 20% of the surface area or less;

a plurality of the conductive tracks inside the networks are arranged such that their periodicity is interrupted, wherein either the azimuth angle is varied in the case of parallel lines or the periodicity changes in the case of wavy lines or the parallelism of linear or wavy strip conductors in the network is interrupted, with the result that when superimposed, the networks display no moiré effect;

the conductive areas being spaced apart from each other by the transparent electrically insulation layer.

2. Touch sensor according to claim 1, wherein a protective layer is in a bend area comprising the fold line.

3. Touch sensor according to claim 1, wherein the third area is transparent.

4. Touch sensor according to claim 1 wherein the third area is non-transparent.

5. Touch sensor according to claim 1 wherein electrically conductive layers, the conductive areas, the strip conductors, the connection tracks for connecting the strip conductors, and/or connections on the plastic film are formed from the same conductive material.

6. Touch sensor according to claim 1 wherein at least the third area has an additional reinforcement and/or protective layer between the first and second transparent areas.

7. Touch sensor according to claim 1 wherein the third area has a gap through which the fold line is shortened.

8. Touch sensor according to claim 1 wherein the plastic film is a transparent or partially transparent plastic film and consists of any one of polyethylene terephthalate or polyethylene or polypropylene or polyvinyl chloride or polystyrene or polyester or polycarbonate or PMMA or polyamide or polyimide.

9. Touch sensor according to claim 1 wherein the plastic film comprises a paper or card layer at least in areas, or consists of paper or card.

10. Touch sensor according to claim 1 wherein the plastic film is formed by a multi-layered hybrid material which comprises plastic layers and layers of fibrous material.

11. Touch sensor according to claim 1 wherein the plastic film has at least one fourth area which adjoins the first and/or second transparent area and wherein, after the adhesion of the first and second areas, the fourth area projects beyond an edge thereof.

* * * * *